(12) United States Patent
Pikus et al.

(10) Patent No.: US 6,482,460 B1
(45) Date of Patent: Nov. 19, 2002

(54) METHOD AND APPARATUS FOR PROCESSING COTTAGE CHEESE

(75) Inventors: Ilya Pikus, Plymouth, MN (US); Kevin Swanson, Blaine, MN (US); George Grant, Orlando, FL (US)

(73) Assignee: Hosokawa Bepex Corporation, Minneapolis, MN (US)

( * ) Notice: Subject to any disclaimer, the term of this patent is extended or adjusted under 35 U.S.C. 154(b) by 0 days.

(21) Appl. No.: 10/051,251

(22) Filed: Jan. 11, 2002

(51) Int. Cl.[7] .......................... A01J 25/00; A23C 19/00
(52) U.S. Cl. .......................... 426/519; 99/348; 99/453; 99/462; 426/582
(58) Field of Search .................. 426/519, 520, 426/582; 99/348, 452, 453, 462, 483

(56) References Cited

U.S. PATENT DOCUMENTS

| | | | | |
|---|---|---|---|---|
| 3,858,855 A | * | 1/1975 | Hazen | 99/462 |
| 3,887,718 A | | 6/1975 | Hinds, Jr. | 426/491 |
| 4,206,696 A | | 6/1980 | Grant et al. | 99/457 |
| 4,321,860 A | * | 3/1982 | Hazen | 99/453 |
| 5,985,347 A | * | 11/1999 | Ejnik | 426/519 |

* cited by examiner

Primary Examiner—George C. Yeung
(74) Attorney, Agent, or Firm—Piper Rudnick; James P. Ryther; R. Blake Johnston

(57) ABSTRACT

A method and apparatus for the production of cottage cheese wherein precut cheese curds are provided in a vat. The curds are subjected to a cooking operation while simultaneously providing for agitation of the curds. The system includes a carriage which traverses the vat back and forth from one end wall to the other. An agitating unit is mounted on the carriage and at least one discharging pipe extends downwardly into the vat from the agitating unit. The agitating unit is continuously oscillated, and the vat is preferably semi-cylindrical in shape, so that the lower discharge end of the pipe moves closely adjacent the vat surface in the course of the combined reciprocating and oscillating movements. Whey is continuously pumped from the vat, pass through a heat exchanger, and then recirculated to the vat through the discharge end of the discharging pipe. The heated whey provides the temperature input for the cooking while the vat contents are being completely and gently agitated by the agitating unit.

20 Claims, 3 Drawing Sheets

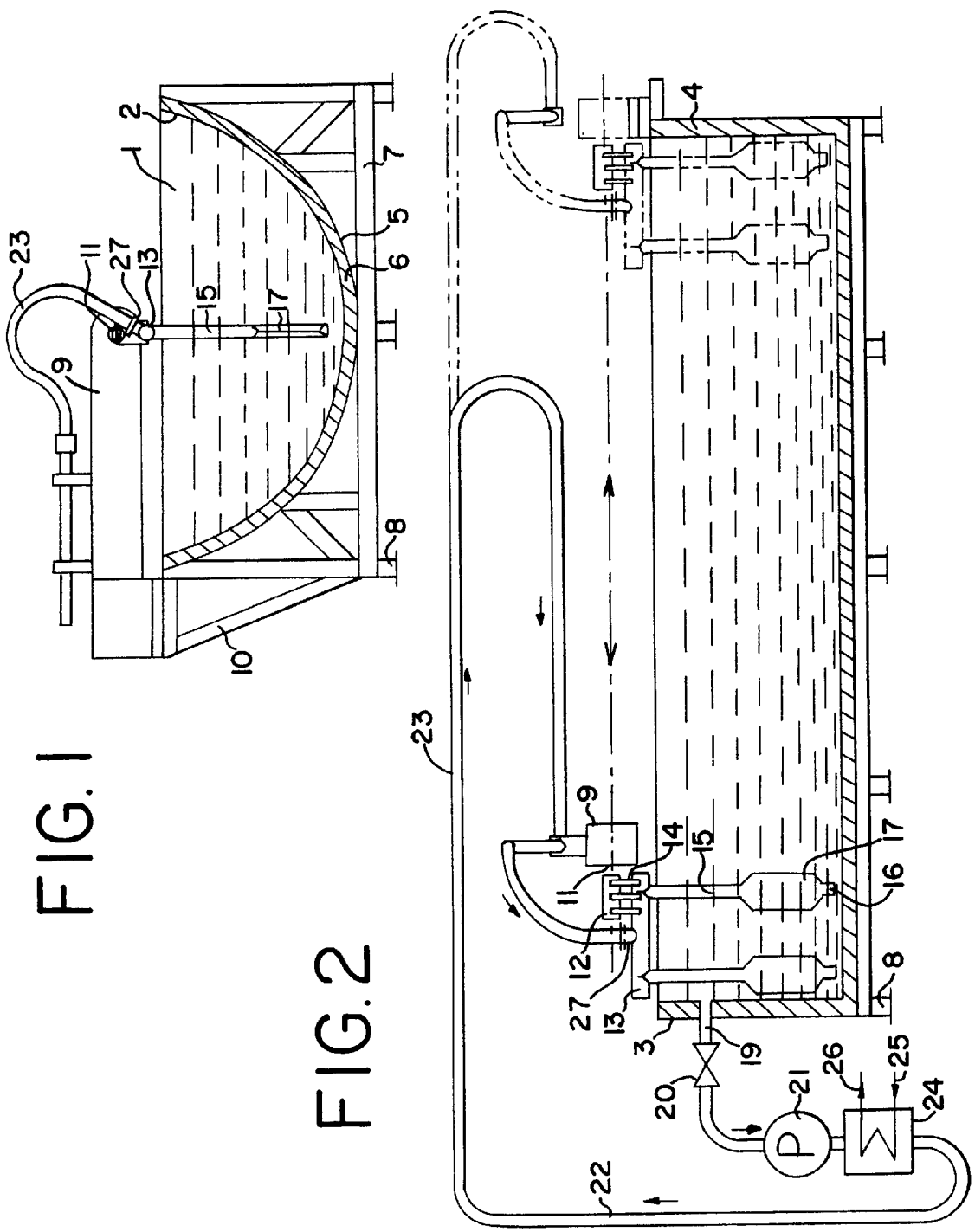

FIG. 3
FIG. 4
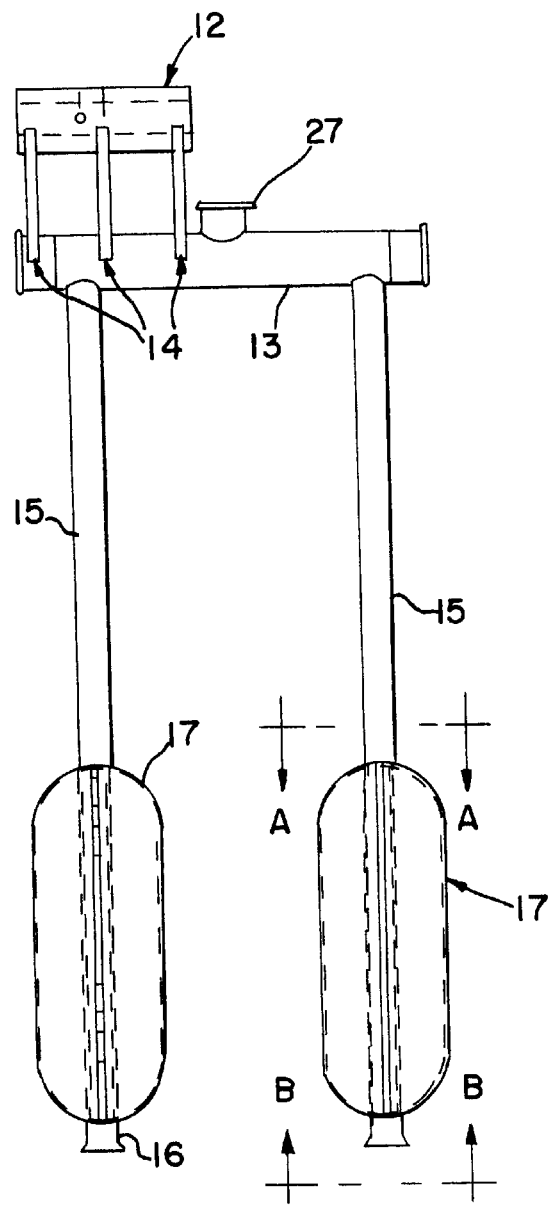
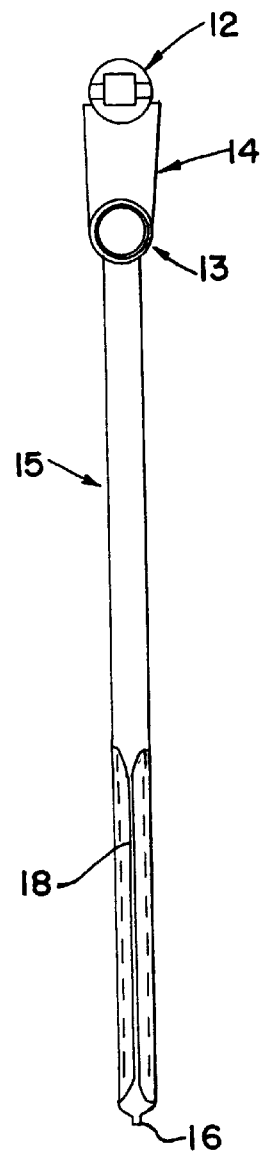
FIG. 5
FIG. 6
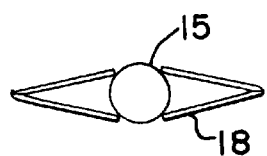
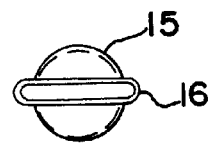

METHOD AND APPARATUS FOR PROCESSING COTTAGE CHEESE

BACKGROUND AND SUMMARY OF THE INVENTION

The present invention relates generally to the field of food processing technology and, more particularly, to food processing for production and processing of semi-liquid food products, specifically, cottage cheese.

Traditionally cottage cheese is made in horizontal vats. After coagulation of the cheese curds, the curds are cut by a wire or blade cutters and then cooked by heating with gentle agitation. The heat is usually supplied by the direct introduction of steam into the vat or by recirculating heated whey.

The "Jet Cooking System" manufactured by Stoelting Inc. is in widespread use commercially and is an example of a heat supply unit which may be used for a cottage cheese cooking process. In such a system, cooking is accomplished by continuously withdrawing whey at the top of the vat with a centrifugal pump, injecting culinary steam into the whey, and returning the heated whey to the upper part of the vat. Problems with such a system, and generally with the concept based on direct introduction of steam into the whey, include the need for utilization of expensive culinary steam which at the end of the process is wasted with the separated whey. Furthermore, direct introduction of the heating steam into the system results in a continuous addition of condensate to the curds-whey mixture in the vat. This complicates the cheese making process control in terms of maintaining acceptable process parameters such as an optimal level in the vat, physical-chemical properties of the whey and curds being cooked, and the heat and mass transfer situation in the processor.

The above-described Jet Cooking System does offer an option to the method of direct introduction of culinary steam into the product. This concept is based on utilization of an indirect heat exchanger located in the whey recirculating line. A heating medium, such as heated water or steam, is introduced into the indirect heat exchanger, and a special immersed strainer/suction tube assembly, located in the top of the vat, is used for continuous intake of circulating whey from the upper part of the whey layer in the vat. The heated whey is returned to the vat through a horizontal discharge jet pipe incorporated in the immersed strainer/suction assembly and located just below the surface of the whey along one side of the wall of the vat. A major disadvantage of this method of cheese processing is that the heat flow which is needed to cook the curd in the vat is continuously supplied to the top layer of whey rather than to the lower layer of the curd particles which tend to settle at the bottom part of the vat after cutting of the coagulum.

In order to continually expose the curd particles to the recirculating heated whey, the prior art cheese making methods provide mechanical agitating means which suspend the fragile curd in the whey. Numerous processing devices are known to the art for agitating and stirring the curd particles and whey in the vat. Problems with prior art mechanical agitating means have, however, been recognized, including the limited ability to pick up, dispense and mix the easily fragmented curd particles located at the bottom, ends, and corners of the vat.

The Verti-Stir Sanitator of the type manufactured by the Stoelting Co. is an example of prior art mechanical agitating means used in the industry. This method of agitation is based on a mechanical paddle-type device which creates a vertical stirring motion that suspends the curd particles in the upper layer of the heated whey in the vat. Because of the improved agitation of the process materials throughout the depth of the bed, the Stoelting process is quite effective for smaller vessels but becomes less efficient with increases in size due to the need to create two-dimensional horizontal movement within the vat contents in order to produce a final product having the same degree of mix consistency. Furthermore, most prior art mechanical agitating means which are used for larger vats are moved longitudinally along the length of the vat at limited speed in order to prevent damage to the delicate cottage cheese particles.

At the localized introduction of the recirculating heated whey in the vat such as with the Stoelting Jet Cooking System, the prior art mechanical agitating means, including the Stoelting Verti-Stir method, are inefficient in terms of overall mixing of the vat contents and maintaining a uniform temperature distribution in the processor. These deficiencies result in a final product having varying degrees of cooking consistency rather than the desired uniform consistency.

In the conventional cheese making vats which are heated by means of the recirculating whey system, the whey is continuously withdrawn from the upper layer of the whey in the vessel and, after being heated in the heat exchanger, is introduced back into this upper layer. This can result in a short-circuiting of the heated whey in the upper portion of the vat. This makes the cottage cheese cooking process less efficient and more difficult to control in terms of maintaining the required product temperature in the vat.

Furthermore, the conventional cheese making process suffers from another significant drawback which is related to the introduction of a higher velocity stream of recirculating heated whey into the upper portion of the vat by means of a horizontal jet pipe. In order to provide the required product heating rate in the vat, the flow rate of the recirculating heated whey, being the only source of the heat supply in the conventional system, is usually maintained relatively high. The introduction of the high velocity and highly turbulized jet stream of the heated whey into the upper portion of the conventional vat in an attempt to provide a maximum possible penetration and distribution of the hot whey into all of the upper layer of the whey/curd contents, causes a disintegration of the very fragile and easily fragmented cottage cheese curd particles in the vicinity of the jet, This results in a higher concentration of fines in the product which causes great difficulties in the system control and reduces the yield of the process.

Other prior art related to the subject matter of the invention is disclosed in the patent entitled "Closed Cheese Making Vat with Recirculating Whey", U.S. Pat. No. 4,321,860. In this system a vertical shaft is mounted for rotation within the vat, and the shaft carries a frame that extends radially outward from the shaft. A series of vertical blades are mounted on the frame. When the shaft is rotating the blades provide a stirring or agitating action. In this prior art apparatus, during the agitation of the precut curds, whey is continuously withdrawn from the upper portion of the vat and after being heated, is recirculated to the lower portion of the vat. The introduction of the recirculating heated whey into the vat is provided through a stationary inlet pipe which is incorporated into the side wall of the vat at the bottom level. When the shaft is rotated in the stirring direction the blades move the mass of curds within the vat to continually expose the curds to the recirculating whey entering the vat. The incoming jet of the whey passes upwardly through the curd to effect the primary agitation.

Despite the fact that, unlike all of the prior art known to the present inventors, the system according to U.S. Pat. No. 4,321,860 provides the heat supply to the curd by recirculating heated whey introduced into the lower portion of the vat, this method still suffers from two significant drawbacks. One of the drawbacks is the necessity to continuously move the entire mass of curds through the vat by rotating the agitator so that the incoming heated whey will contact and agitate the product being cooked. This intensive mechanical energy application provided by the pushing action of the rotating agitator blades leads to extensive fragmentation of the fragile curds thus reducing the yield of the process due to solids loss of cheese curds into the whey.

Another drawback is caused by the stationary location of the heated recirculating whey which is being introduced to the vat. This occurs because excessive velocity of the whey pumped into the lower portion of the vat can damage the curds and, accordingly, the velocity of the whey being returned to the vat is maintained at a relatively low level (lower than 150 feet per minute). The result is that there is only a very limited penetration of the entering whey jet into the moving mass of curds. The limited localized hydrodynamic agitation of the product takes place only in the vicinity of the stationary inlet means, and cannot provide efficient heating of the curds and a required uniform temperature distribution in the entire mass of contents in the vat. The above problems become even more difficult to resolve with increases in the size of the cottage cheese processing vat.

Due to advantages in the construction and operation of horizontal vats with increased capacity, the above-referenced vertical vat technology did not find an application in the cottage cheese making industry. Notwithstanding the advantages of the cheese cooking process with recirculating whey, the method disclosed in the above U.S. Pat. No. 4,321,860 cannot be utilized in horizontal vats.

The modern cottage cheese making practice has generated even more stringent operating standards and requirements for the cheese processing vats. Some of these new requirements, such as the need to process an ultra filtrated skim milk with a higher solids content and production of larger curds size at a maximum product yield, along with the need for increased capacity of the processing vessels, result in significant production difficulties.

In order to achieve the required standard of operation it would be advantageous to have a horizontal cottage cheese making vat that reduces problems associated with an inefficient heat supply and the resultant temperature gradient over the contents of the vat. It would also be advantageous to reduce these problems while also providing gentle agitation primarily by moveable jet streams of the recirculating heated whey which are introduced into the lower portion of the vat while avoiding the melting together of solid material.

SUMMARY OF THE INVENTION

The invention relates to an improved method and apparatus for cottage cheese making and, in particular, to the cooking stage of the system which takes place after cutting. As stated, for example, in the aforementioned U.S. Pat. No. 4,321,860, there are known mechanical means available for such cutting.

In accordance with this invention, the processing vat is composed of a horizontally oriented semi-cylindrical vat with two vertical end plates. A reciprocating agitating unit is mounted on a traversing carriage above the vat and includes a horizontal drive shaft that extends along the central axis of the semi-cylindrical vat. Mounted on the reversible drive shaft is a coupling and a horizontal whey distributing manifold is attached to the coupling by means of gusset plates. One or several whey discharging pipes are connected to the whey distributing manifold and they are positioned so that they are radially extended below the manifold into the semi-cylindrical volume of the vat.

The whey discharge opening of discharge pipe is located a short distance from the circumferential inner surface of the vat. This opening at the lower end of the whey discharge pipe has the configuration of a flat pattern nozzle with the longitudinal center line of the nozzle being directed preferably along the longitudinal center line of the semi-cylindrical vat.

Attached to the lower end of each whey discharge pipe directly above the whey discharge opening is an agitating (stirring) paddle which has a symmetrical configuration with two curd engaging faces positioned along the center line of the vat.

During the agitation cycle the reversible drive repeatedly rotates the agitating unit alternately clockwise and counter-clockwise so that the whey discharging pipes with the paddles attached move back and forth through a generally semicircular path in a vertical plane of the curd-filled volume of the vat. Whey is continuously withdrawn from the upper portion of the vat by the pump and, using the rotatable agitating whey discharge unit, which includes the whey distributing manifold and whey discharging pipes, the whey is re-introduced into the lower portion of the vat which is filled with curds.

The flat pattern streams of the recirculating whey discharged from the repeatedly rotatable clockwise/counter-clockwise whey discharging pipes provide gentle hydrodynamic agitation for the curds. The paddles, which are attached to the whey discharging pipes, have such an overall construction so as to provide a smooth streamlined flow around. This further contributes to the agitating efficiency of the device, minimizing the fragmentation or disintegration of the curds.

During the cheese making operation, the agitating unit is reciprocated along the length of the vat by means of a traversing carriage, for instance, a mechanical arm, thereby providing a repeated zonal agitation all over the operating volume of the vat. A flexible hose is provided to connect the stationary whey recirculating piping system with the whey distributing manifold which is installed on the mobile reciprocating-traversing carriage.

During the heating of the vat's contents in the course of the cheese cooking cycle, the recirculating whey is heated by means of a heat exchanger which is included in the whey recirculation piping system. Therefore, the rotatable reciprocated agitating unit employed by the present invention to both gently agitate and supply heat directly into the layer of the curds provides very efficient and uniform thermal processing of cheese all over the operating volume of the vat. The invention also provides means for uniform heat distribution throughout the length of a large oblong vat and avoids the use of cumbersome complicated mechanical agitators thereby reducing the overall cost of the cheese making system and facilitating the cleaning of the apparatus after the process has been completed. By utilizing means which facilitate both gentle agitation and highly efficient heat supply by discrete streams of heated recirculated whey discharged through the mobile reciprocating nozzles, the operating conditions in the vat can be precisely controlled resulting in increased yields.

BRIEF DESCRIPTION OF THE DRAWINGS

FIG. 1 is a vertical section of the cheese making vat;

FIG. 2 is a side elevation sectional view of the cheese making vat showing the recirculation of the whey in a schematic form;

FIG. 3 is a side view of the agitating unit utilized in the practice of the invention;

FIG. 4 is an end view of the agitating unit;

FIG. 5 is a cross sectional view of a discharging pipe utilized in the practice of the invention taken along line A—A of FIG. 4;

FIG. 6 is an enlarged bottom end view of a discharging pipe taken along line B—B of FIG. 4; and, FIG. 7 is a vertical section of the vat illustrating drive means for the agitating unit and traversing carriage.

DETAILED DESCRIPTION OF THE INVENTION

Figure 7:
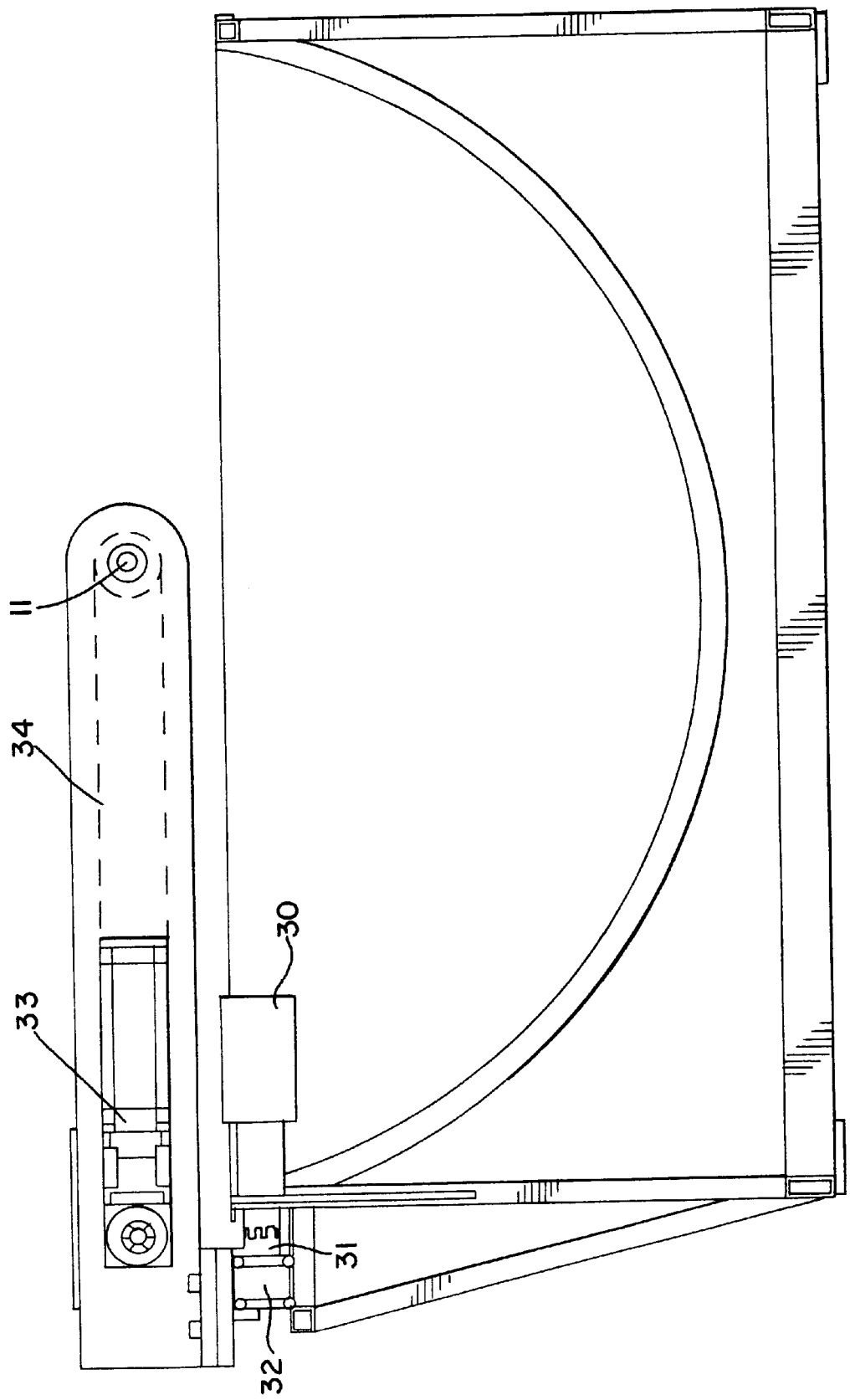

The drawings illustrate a semicylindrical vat 1 which is typically made of stainless steel or similar non-corrosive material. The vat is composed of a semicylindrical inner shell 2 and vertically disposed end walls 3 and 4. An outer shell 5 is disposed around the inner shell 2 and a space is defined therebetween with insulation 6 occupying this space. A support structure 7 for the vat includes supporting legs 8.

A traversing carriage 9 extends from one side of the vat and over the top thereof in cantilever fashion with the carriage end extending to approximately the center line of the vat. As best shown in FIG. 7, the carriage is driven by motor 30 which operates a rack and pinion drive through gear transmission 31 whereby the carriage is moved back and forth on track 32 which is mounted on carriage support structure 10. It will be appreciated that various drive means may be employed for causing the carriage to traverse back and forth along track 32.

The drive shaft 11 is mounted on the carriage 9 and extends outwardly therefrom for attachment of coupling 12 thereto. FIG. 7 illustrates reversible drive motor 33 which drives belt 34 extending to the drive shaft 11. The motor 33 functions independently of the motor 30 and thereby operates to continuously oscillate the shaft and coupling in the course of the operation of the system. Various other means for providing the oscillation of the shaft 11 are also available for use.

As shown in FIG. 1, the axis of the drive shaft 11 is centered over the vat. A manifold 13 is attached to the coupling 12 by means of gusset plates 14, and whey discharging pipes 15 are connected to the manifold in spaced-apart relationship. Each of the discharging pipes includes a lower end defining a discharge nozzle 16 which, as shown in FIG. 6, preferably comprises a flat pattern nozzle having the longitudinal center line thereof parallel to the longitudinal center line of the vat. A single discharging pipe could be used but two or more, depending to some extent on the size of the vat, are preferred for maximum operating efficiency.

The portion of each discharging pipe located just above the nozzle 16 preferably comprises an agitating or stirring paddle configuration 17 As best shown in FIGS. 3, 4 and 7, these paddles form curd engaging faces which are formed by the blades 18 welded together in a v-shaped configuration.

FIG. 2 illustrates an outlet pipe 19 which is connected to the valve 20 positioned adjacent the top of the vat. The outlet is provided for withdrawing whey from the upper portion of the vat and the valve is used to control the flow rate of recirculating whey and the liquid level in the vat. The valve and associated pump 21 are located in conduit 22 which is maintained stationary relative to the vat. A flexible hose 23 extends outwardly from the conduit 22 and this hose is therefore adapted to move relative to the stationary conduit.

Heat exchanger 24 is associated with conduit 22 for controlling the temperature of the whey passing through the conduit. Inlet 25 and outlet 26 are provided for the heating medium which may be heated water or steam.

An inlet pipe 27 is associated with the manifold 13 for attachment of the flexible hose 23. Brackets 28 are mounted on the carriage 9 for attachment of the hose 23 whereby the end of the hose attached to the pipe 27 moves with the carriage and associated manifold in the operation of the system.

In the course of the operation, agitation of the contents of the vat 1 is achieved due to the continuous oscillating movement of the drive shaft 11 and associated manifold 13 and discharging pipes 15 as indicated by the arrows shown in the drawing. The nozzles 16 extend closely adjacent the bottom surface of the vat and, preferably, the pipes traverse an approximately semicircular arc whereby the whey in the vat is essentially completely subjected to the agitating influence.

As the agitation takes place, whey is continuously withdrawn from the upper portion of the vat through outlet 19, heated as it passes through heat exchanger 24, and then recirculated to the vat through conduit 22 and hose 23. The manifold 13 then distributes the whey into the discharging pipes 15 for passage out through the nozzles 16.

The flat pattern streams passing out of the nozzles 16 provide gentle hydrodynamical agitation of the curds. The configuration of the paddles 17 provide a smooth, streamlined flow around the pipes. This combination provided by the nozzles and paddles eliminates or at least minimizes the fragmentation or disintegration of the curds.

While the discharging pipes are operating to accomplish this agitating action, the carriage 9 is being continuously moved longitudinally of the vat along the track 32 by means of the motor 30. Accordingly, the system ensures that the entire contents of the vat are subjected to the agitating action.

Suitable circumferential or tip speed for the nozzles 16 is in the order 0.2 to 1.5 feet per second, preferably, 1 foot per second. These parameters provide the desired gentle hydrodynamical/mechanical agitation and uniform heat supply to the bed of curds. The injection of the recirculating heated whey into the lower portion of the vat is particularly important to the accomplishment of these results.

The radial clearance between the open ends of the nozzles 16 and the adjacent vat surface is preferably in the range of 0.5 to 3 inches. The particular clearance selected will depend on the size of the vat, the discharge velocity of the recirculating whey from the nozzle, the density of the whey/curds blend, and the size of the curd particles.

The discharge velocity of the whey from the nozzles 16 is preferably maintained in the range of 2.5 to 5 feet per second in order to provide optimal hydrodynamical agitation of the curds and to avoid possible curd damage. This can take place if the velocity of the whey entering the curd bed is maintained at too great a level.

The reciprocating traversing carriage 9 can either be moved continuously along the vat or in increments which would provide a successive or step-by-step zonal agitation and heat supply throughout the vat. The horizontal, longitudinal speed of the traversing carriage is maintained in the range of 0.2 to 0.5 feet per second depending on the length of the vat, and also on the number of incremental movements desired if that operating option is chosen.

During the initial stage of the agitating and cooking process of the invention, the precut curd particles are in a relatively fragile state. Accordingly, it is desirable at this time to maintain the rotational speed of the agitating pipes and the linear speed of the traversing carriage at relatively slow rates, i. e., at the lower end of the range of recommended speeds. As the curd particles become more firm in the process of cooking the agitator rotational speed and possibly the carriage traversing speed is increased and maintained at the preferred higher level.

For the same reason, the flow rate and discharge velocity of the recirculating whey are maintained at a relatively low level in the initial stage of the operation until the temperature of the curds/whey content in the vat increases from the initial temperature of approximately 90 degrees F. to a value of about 110 to 115 degrees F. At this time the flow rate is increased and maintained at a relatively high level corresponding to the whey discharge velocity of 4.5 feet per second until the product achieves the cut-off temperature of 125 to 140 degrees F.

It will be understood that the foregoing operating parameters are provided primarily as examples of suitable operating parameter and can be varied for a number of reasons including the size of the precut curd particles. The heating and agitating concepts of the invention as described above allow for relatively simple adjustments and automatic process control whereby the invention can be utilized in connection with many different customized products including the varieties of curd sizes that are currently commercially desired.

It will be understood that various changes in the practice of the invention may be made without departing from the spirit of the invention particularly as described in the following claims.

What is claimed is:

1. A method for the production of cottage cheese wherein cheese curds and whey are provided in a vat defined by longitudinally extending walls and end walls, the curds are subjected to a cutting operation to form discrete pieces, and the curds are then cooked, the method comprising the further steps of providing an agitating unit for agitation of the curds while the curds are being cooked, mounting said agitating unit on a carriage which traverses the vat from one end wall to the other, reciprocating said carriage to move said agitating unit back and forth between said end walls, providing a drive means for said agitating unit, oscillating said agitating unit transversely of the direction of movement of said carriage, said agitating unit comprising at least one whey discharging pipe extending from an inlet location adjacent said carriage to a location adjacent said longitudinally extending walls whereby said curds are engaged by said pipe as said carriage traverses the vat and as said agitating unit oscillates, and including the step of continuously withdrawing whey from said vat, passing said whey through a heat exchanger to heat the whey, and continuously recirculating said heated whey to said discharging pipe, said discharging pipe including an opening for continuous passage of the heated whey back into the vat for thereby cooking said curds.

2. A method according to claim 1 wherein said longitudinally extending walls define a semi-circular shape, and including the step of locating the axis of said agitating unit along the longitudinally extending centerline of the semicircle defined by said vat, said discharging pipe extending radially outwardly from said axis.

3. A method according to claim 2 including the step of providing a plurality of discharging pipes, providing nozzles at the bottom ends of said discharging pipes and discharging said whey from the open ends of said nozzles in flat pattern streams.

4. A method according to claim 3 including the step of providing paddles adjacent the bottom ends of said discharging pipes, said paddles extending outwardly on both sides of said pipes in a direction generally parallel to said axis of said agitating unit.

5. A method according to claim 1 wherein said carriage moves continuously while traversing said vat.

6. A method according to claim 1 wherein said carriage moves in increments in a step-by-step fashion while traversing said vat.

7. A method according to claim 3 including the step of oscillating said agitating unit to provide a tip speed for said nozzles between 0.2 and 1.5 feet per second.

8. A method according to claim 3 wherein the radial clearance between the open ends of said nozzles and the surface of said longitudinally extending walls is between 0.5 and 3 inches.

9. A method according to claim 3 wherein the discharge velocity of the whey from said nozzles is between 2.5 and 5 feet per second.

10. A method according to claim 1 wherein the speed of said carriage is between 0.2 and 0.5 feet per second.

11. A method according to claim 3 including the steps of oscillating said agitating unit to provide a tip speed for said nozzles between 0.2 and 1.5 feet per second, maintaining the discharge velocity of the whey from said nozzles between 2.5 and 5 feet per second, and maintaining the speed of said carriage between 0.2 and 0.5 feet per second.

12. A method according to claim 11 wherein said tip speed, said discharge velocity and said carriage speed are maintained at the lower ends of the operating ranges until the temperature of the curds/whey content of the vat has reached between 110 to 115 degrees F., and then increasing said tip speed, discharge velocity and carriage speed until completion of the cooking.

13. An apparatus for the production of cottage cheese wherein cheese curds and whey are provided in a vat defined by longitudinally extending walls and end walls, the curds are subjected to a cutting operation to form discrete pieces, and the curds are then cooked, the apparatus comprising an agitating unit for agitation of the curds while the curds are being cooked, a carriage for said agitating unit mounted over said vat, said agitating unit extending downwardly into said vat, means for driving said carriage and said agitating unit longitudinally back and forth between the end walls of the vat, means supported by said carriage for oscillating said agitating unit in a direction perpendicular to the longitudinal movement of said carriage, said agitating unit including at least one whey discharging pipe having an inlet end adjacent said carriage and a discharge end positioned at a location adjacent the surface of said longitudinally extending walls, means for withdrawing whey from said vat, a heat exchanger positioned outside said vat for heating the withdrawn whey, and means for delivering the heated whey to the inlet end of said discharging pipe for passage through the pipes and for discharge back into the vat through said discharge end.

14. An apparatus according to claim 13 wherein said agitating unit includes a manifold, a plurality of discharging pipes, the inlet ends of said discharging pipes communicating with said manifold, and including a hose connected to said manifold for delivering the heated whey to the manifold prior to delivery to said discharge ends.

15. An apparatus according to claim 14 wherein said longitudinally extending walls define a semi-circular shape, an axis about which said agitating unit oscillates, said axis extending along the longitudinal centerline of the semi-circle defined by said vat, said discharge pipes extending radially outwardly from said axis.

16. An apparatus according to claim 15 wherein said carriage extends in cantilever fashion inwardly from the side of said vat and said carriage defining an end positioned at said centerline, said agitating unit being supported for oscillating movement on said end of said carriage, and drive means for said carriage located along the side of said vat.

17. An apparatus according to claim 16 wherein said agitating unit is oscillated by a drive means supported on said carriage.

18. An apparatus according to claim 16 including a flexible hose extending to said agitating unit on said carriage for delivering the heated whey from said heat exchanger while said carriage is moving.

19. An apparatus according to claim 14 including nozzles attached to the discharge ends of said discharging pipes, said nozzles being designed to discharge flat pattern streams of heated whey.

20. An apparatus according to claim 14 including paddles attached adjacent the discharge ends of said discharging pipes, said paddles extending outwardly on both sides of said pipes in a direction generally parallel to said axis of said agitating unit.

* * * * *